United States Patent [19]
Harting et al.

[11] Patent Number: 5,930,426
[45] Date of Patent: Jul. 27, 1999

[54] OPTICAL FIBER CONNECTOR

[75] Inventors: Dietmar Harting, Espelkamp, Germany; Jean-Merri de Vanssay, Paris; Jean-Francois Bernat, Sartrouville, both of France

[73] Assignee: Harting KGaA, Espelkamp, Germany

[21] Appl. No.: 08/847,163

[22] Filed: Apr. 30, 1997

[30] Foreign Application Priority Data

May 2, 1996 [DE] Germany ............ 296 07 793 U
May 14, 1996 [DE] Germany ............ 196 19 374

[51] Int. Cl.[6] ........................................ G02B 6/38
[52] U.S. Cl. .................. 385/56; 385/55; 385/58; 385/59; 385/62; 385/71; 385/72; 385/77; 385/78; 385/81; 385/139
[58] Field of Search ................ 385/55, 56, 58, 385/60, 59, 62, 66, 70, 72, 77, 78, 81, 84, 87, 139, 71

[56] References Cited

U.S. PATENT DOCUMENTS

| | | | |
|---|---|---|---|
| 5,082,344 | 1/1992 | Mulholland et al. | 385/60 |
| 5,091,991 | 2/1992 | Briggs et al. | 385/82 |
| 5,121,454 | 6/1992 | Iwano et al. | 335/60 |
| 5,123,071 | 6/1992 | Mulholland et al. | 385/53 |
| 5,329,604 | 7/1994 | Baldwin et al. | 385/92 |
| 5,542,015 | 7/1996 | Hultermans | 385/60 |
| 5,548,677 | 8/1996 | Kakii et al. | 385/92 |
| 5,631,990 | 5/1997 | Hashizume | 385/92 |

FOREIGN PATENT DOCUMENTS

| | | | |
|---|---|---|---|
| 0 430 107 A2 | 6/1991 | European Pat. Off. | 385/53 X |
| 0 697 607 A1 | 2/1996 | European Pat. Off. | 385/53 X |
| 3539988 A1 | 5/1987 | Germany | 385/53 X |

Primary Examiner—Brian Healy
Attorney, Agent, or Firm—Dorn, McEachran, Jambor & Keating

[57] ABSTRACT

For a connector, preferably a connector for optical waveguides, which is arranged jointly with electrical connectors on a printed board which can be plugged into a rack, it is proposed to equalize the tolerances in the direction of insertion defined by the electrical connectors in that the connector half for optical waveguides arranged in the rack has a plug-in part latched and held in a carrier body and that when the connector halves are assembled this latching is released and a latching with the connector half of the printed board takes place, wherein by means of the released latching with the carrier body the plug-in part is held therein in a displaceable manner.

5 Claims, 20 Drawing Sheets

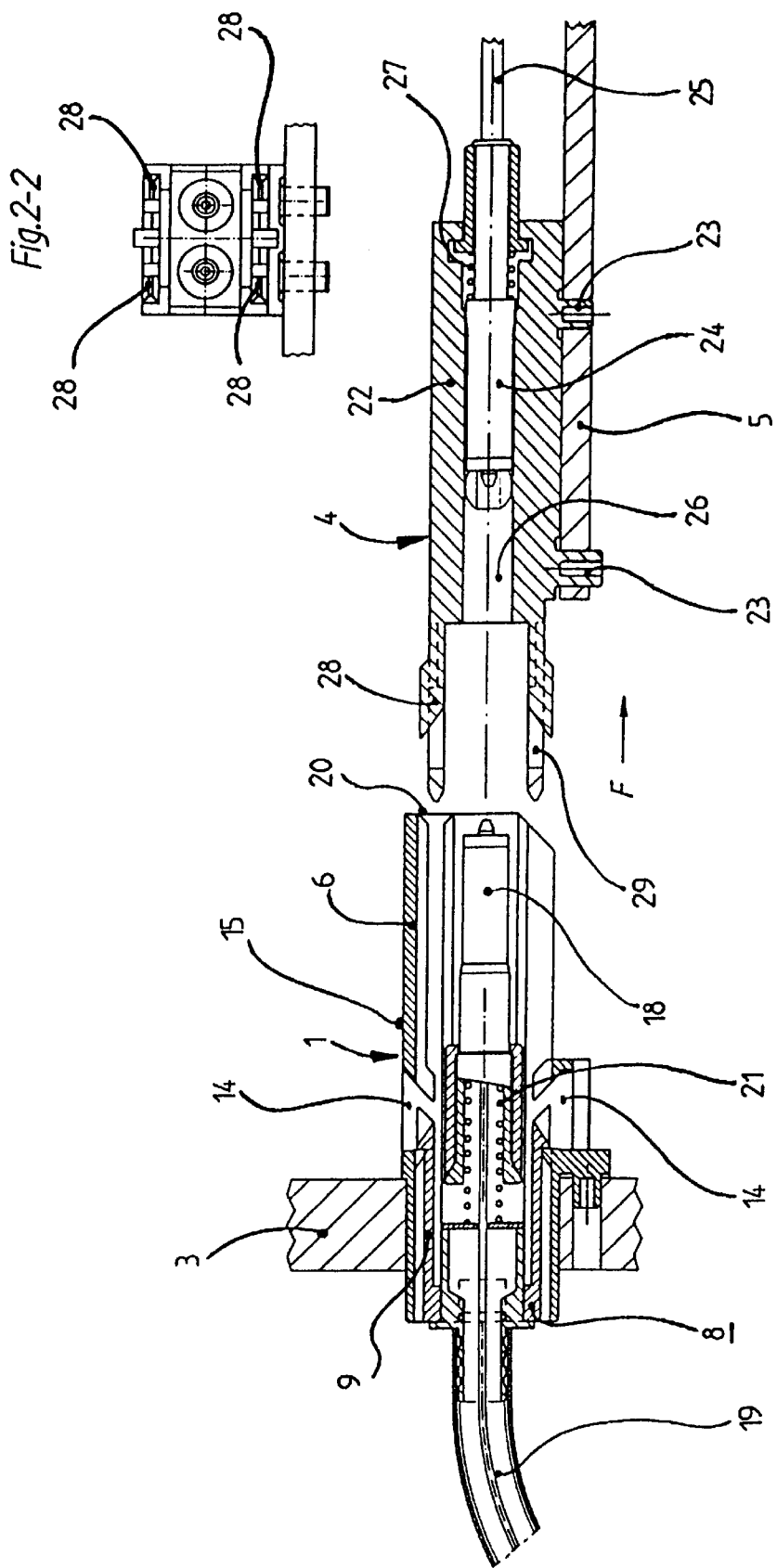

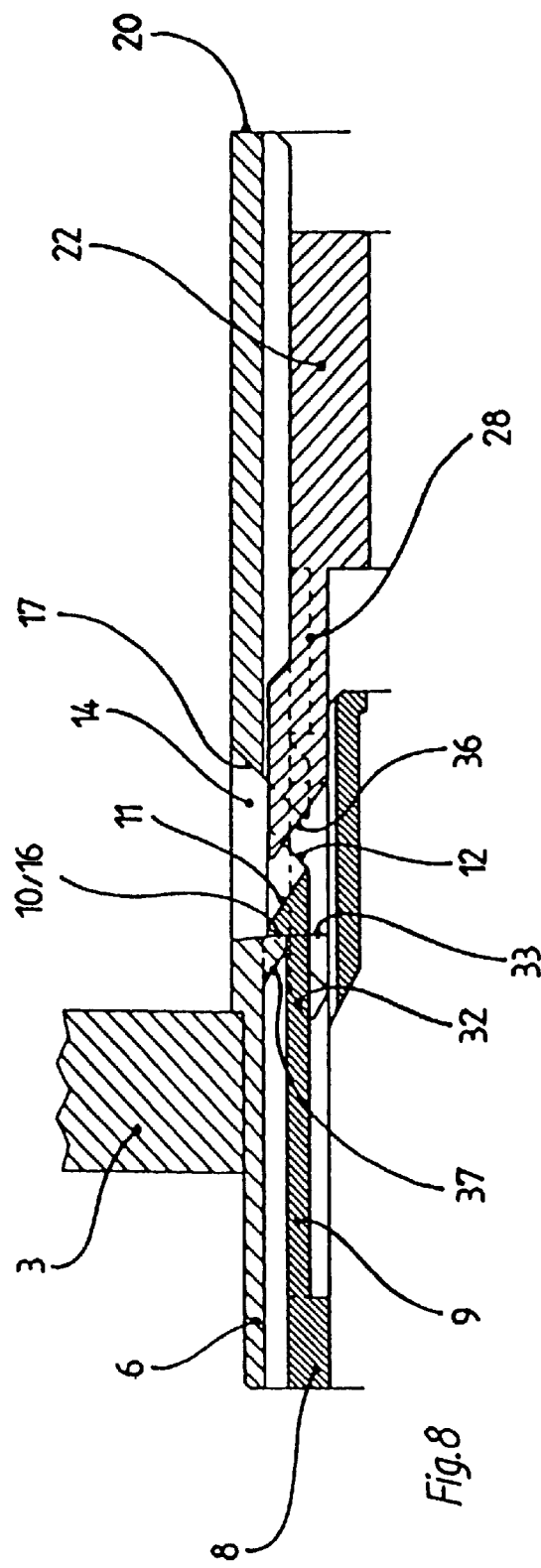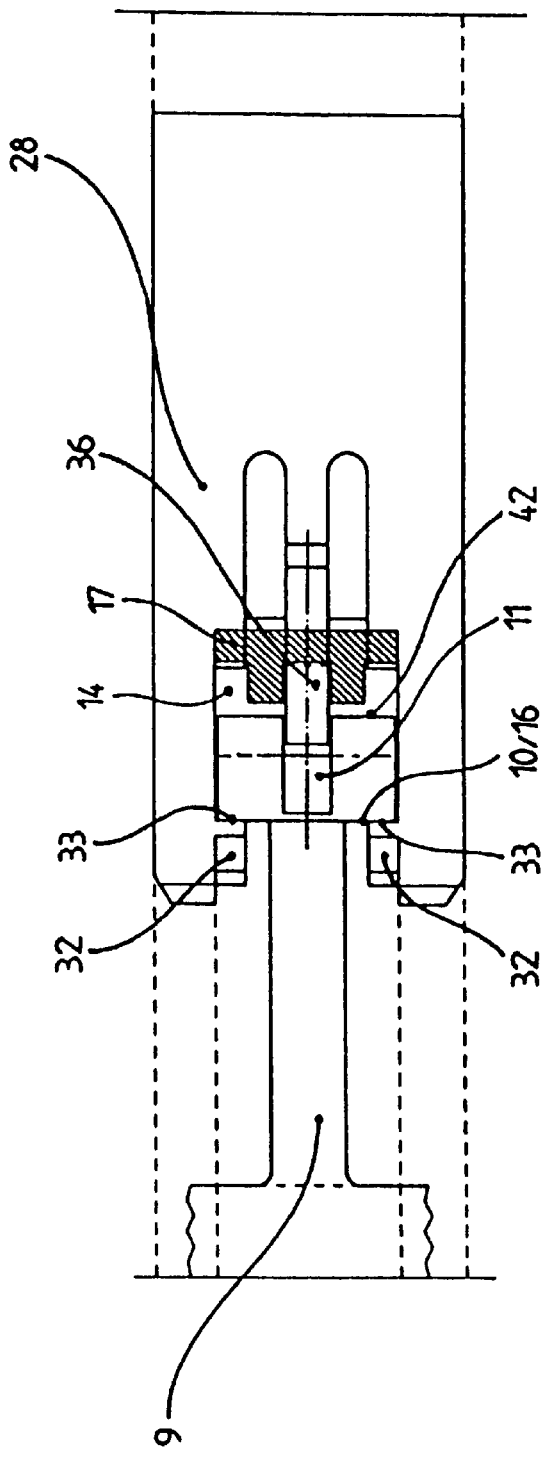

OPTICAL FIBER CONNECTOR

BACKGROUND OF THE INVENTION

The invention relates to a connector, preferably a connector for optical waveguides, comprising two connector halves which latch together when assembled and in which at least one plug-in and/or contact part is held in each case, and wherein the faces of the plug-in and/or contact parts are pressed against each other in a resilient manner when the connector halves are assembled.

Such connectors are used, for example, for coupling optical waveguides in so-called rear panel systems, wherein a rear panel of a rack for receiving printed boards is designed as a printed board and is provided with optical waveguide connector halves which can be assembled with corresponding complementary connector halves which are provided on printed boards which can be plugged into the rack. In addition to optical waveguide connector halves the plug-in printed boards should also have per se known, standard connectors for transmitting electrical signals.

Optionally provision can also be made for the connector halves provided in the rack not to be arranged on a printed board but to be fixed to the frame structure of the rack.

In a device of this kind it is necessary for the plug-in tolerances in the direction of insertion, which are defined by the use of different standard electrical connectors, to be equalized in the case of the optical waveguide connector also, so that the ends of the optical waveguides are always closely superposed. When the optical waveguide connector is plugged in, as far as possible it should not exert any force on the rear panel printed board.

SUMMARY OF THE INVENTION

The object of the invention is therefore to develop a connector of the above-mentioned kind in such a way that tolerances in the direction of insertion, i.e. the different plug-in depths of the connectors which are per se permissible for the electrical connectors, tolerances which are defined by electrical connectors of the most varied standard types (e.g. IEC 1076-4-100 or IEC 1076-4-101), are equalized by the connector in such a way that the faces of the plug-in ends of the optical waveguides and/or of the end pressure contacts are always pressed against each other with consistent pressure, and that the connector does not exert any forces on the rear panel printed board.

This object is achieved in that the first connector half has a carrier body in which a plug-in part is inserted and initially latched, wherein the plug-in end of an optical waveguide and/or of an end pressure contact is held in the plug-in part against the force of a spring in a longitudinally movable manner, that the second connector half contains the plug-in end of an optical waveguide and/or of an end pressure contact, that latching means for latching with the plug-in part of the first connector half are provided on the second connector half, that the latching between the plug-in part and the carrier body is released when the connector halves are assembled, that a latching of the plug-in part with the second connector half takes place before the release of this latching, wherein the plug-in part is then held in the carrier body in a longitudinally displaceable manner, and that when the connector halves are separated, a latching of the plug-in part with the carrier body initially takes place again and then the latching between the plug-in part and the second connector half is released.

Advantageous embodiments of the invention are quoted in claims 2 to 6.

The advantages achieved with the invention comprise in particular the fact that very large plug-in tolerances in the direction of insertion are equalized by means of the connector according to the invention and that the connector can be designed to be extremely small, already by means of the use of a single spring arm on the plug-in part and one latching arm on the holding part for the various latching and holding functions. This miniaturization of the system is achieved in that the various actuation chamfers act concurrently and independently of one another. This means that little space in respect of the length of the connector halves is required for the arrangement of the chamfers and a relatively large clearance is present for the free movement of the plug-in part latched with the holding part inside the carrier body.

Even if only one spring arm is optionally provided, the latching is already extremely reliable, because the spring arm, which is symmetrical in respect of its centre axis, has all latching stops and actuation chamfers in duplicate. Furthermore, the connector can be manufactured extremely cheaply because the various components with their chamfers and stops can be produced by means of simple, conventional injection moulding processes.

A further advantage lies in the fact that the spring arm serving for the latching is always unloaded, i.e. not deflected, when the connector is plugged in and when it is not. From the outset this rules out fatigue phenomena caused by the ageing of the material.

BRIEF DESCRIPTION OF THE INVENTION

An embodiment of the invention is shown in the drawing and will be described in greater detail below.

FIG. 1 shows a perspective and exploded view of a connector for optical waveguides, FIGS. 2-1 and 2—2 shows the views of the connector prior to assembly, FIGS. 3-1 to 3-6 show views of the latching and locking elements of the connector in various stages of assembly, FIGS. 4-1 to 4-5 show views of the latching and locking elements of the connector in various stages of separation, FIG. 5 shows an enlarged view of the latching arm of the second connector half, FIGS. 6-1, 6-2 show enlarged views of a cut-out of the upper wall of the carrier body, FIGS. 7-1, 7-2 show enlarged views of the spring arm of the carrier body, FIG. 8 shows an enlarged view of the cooperation of latching and spring arm, FIG. 9 shows a top view onto the view of FIG. 8, FIGS. 10-1, 10-2 show enlarged views of a modified spring arm, FIG. 11 shows a view of the latching and locking elements when the connector with the modified spring arm is assembled and FIG. 12 shows a view of the latching and locking elements when the connector with the modified spring arm is separated.

DETAILED DESCRIPTION OF THE INVENTION

Figure 1:
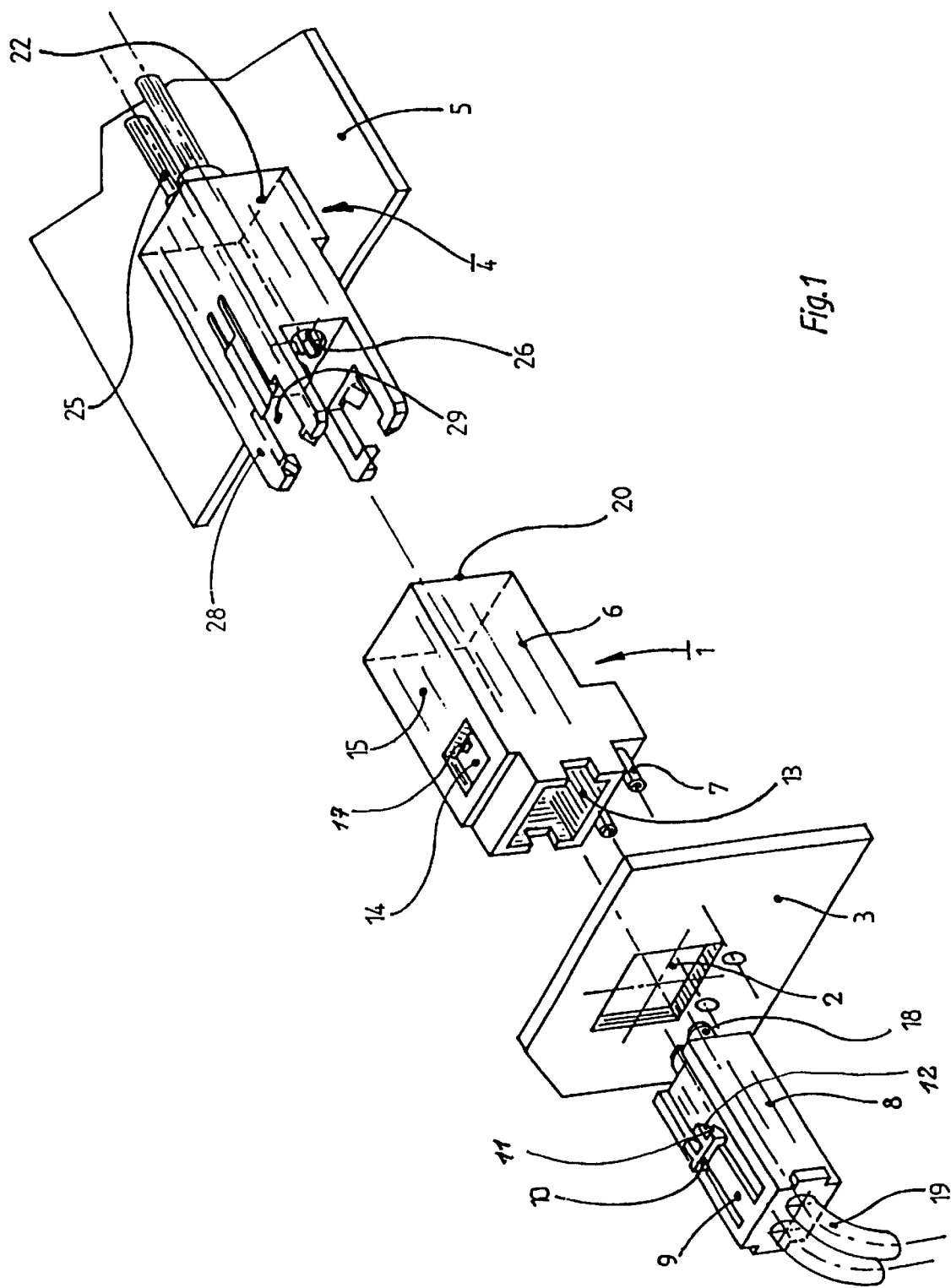
Figures 1, 3:
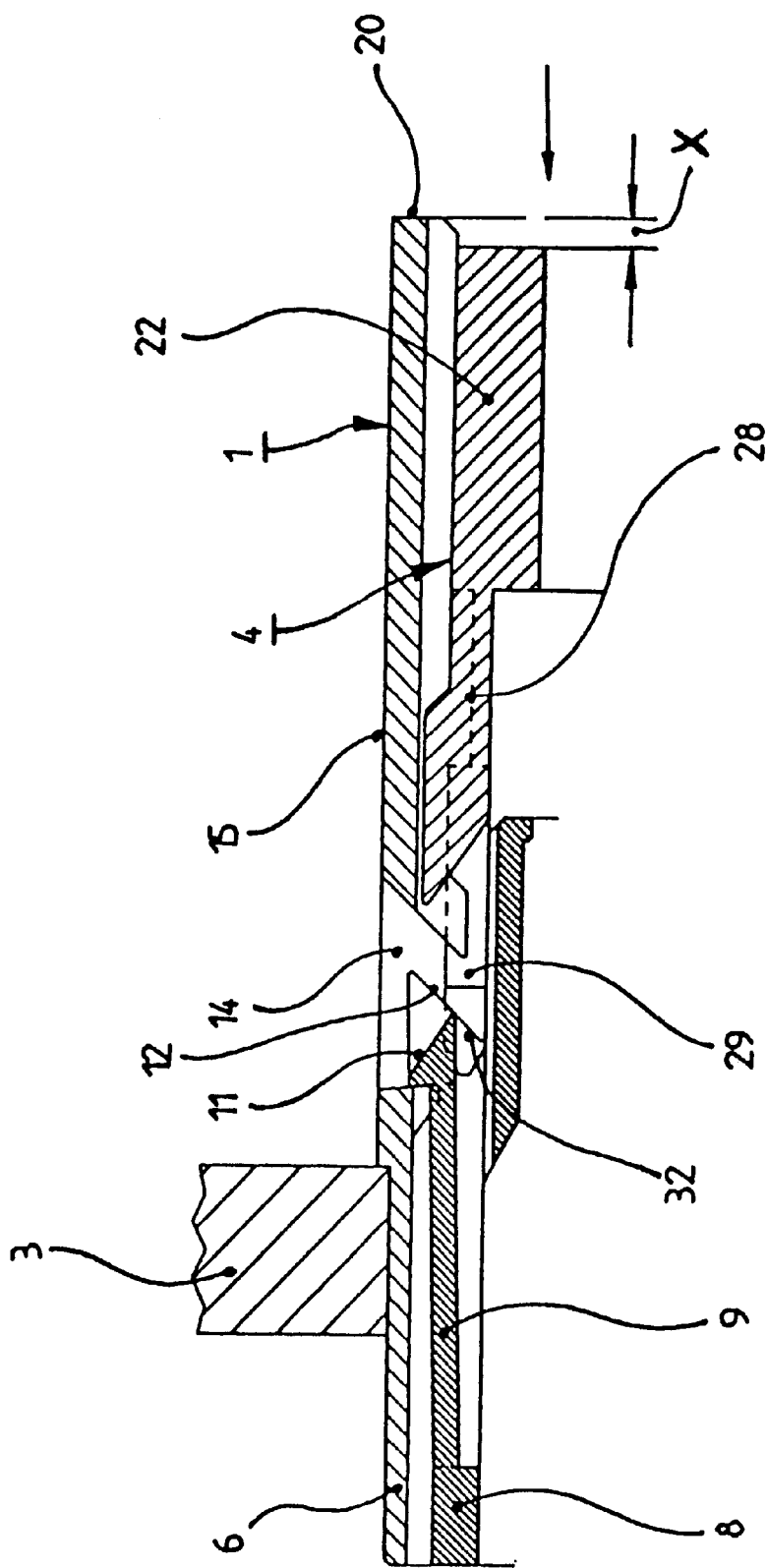
Figures 2, 3:
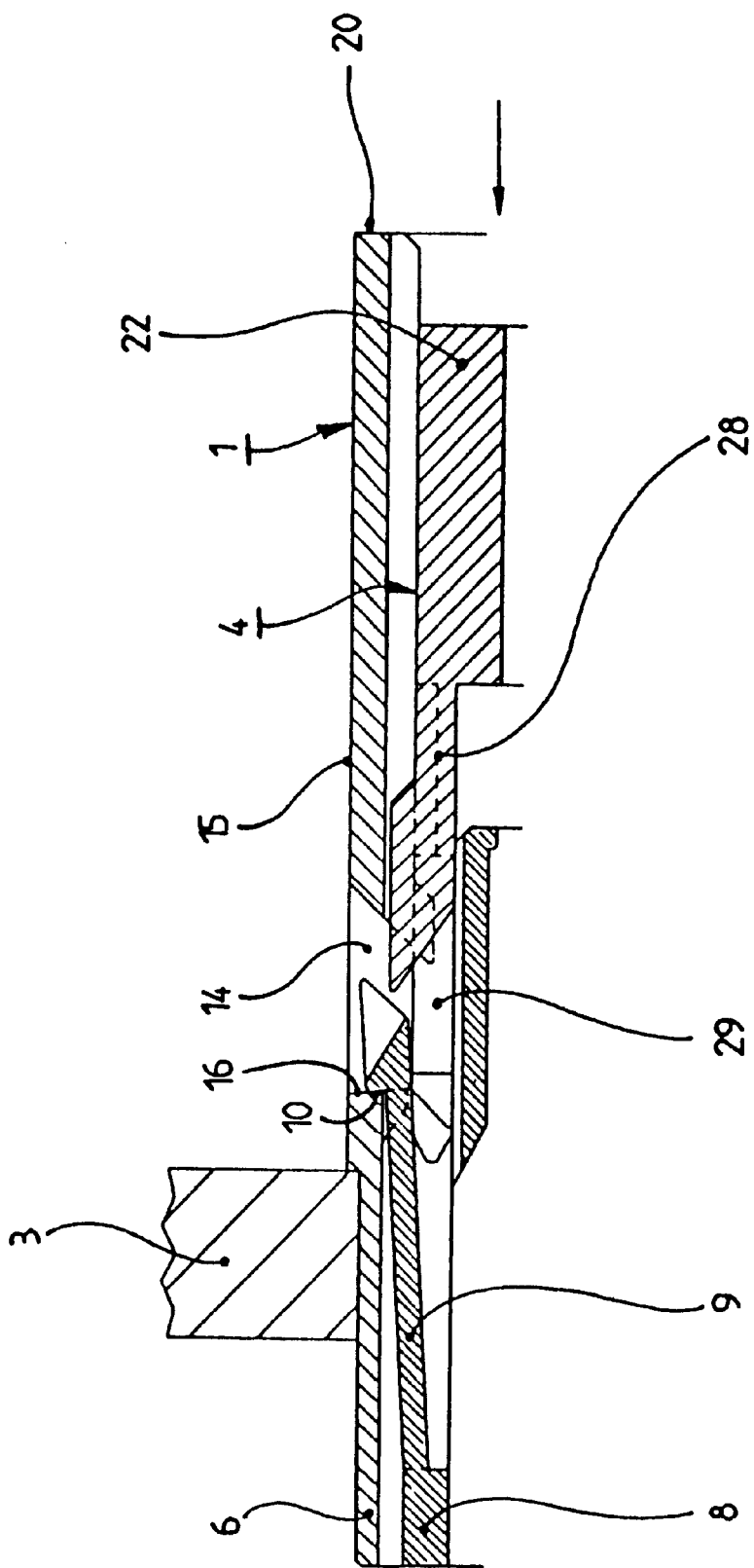
Figure 3:
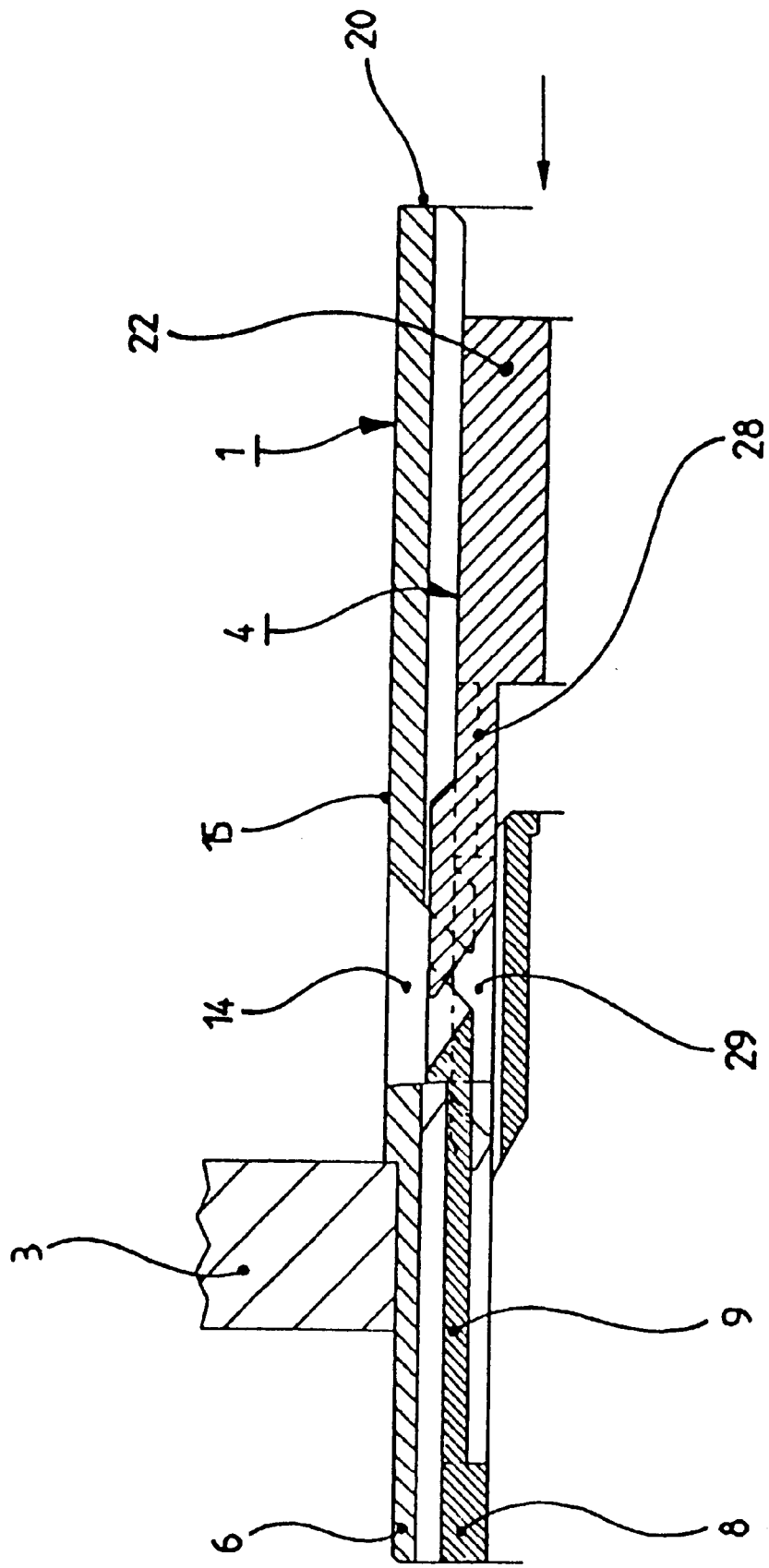

The connector for optical waveguides shown in FIGS. 1 and 2 substantially comprises two rectangular connector halves, each of which is fixed to a printed board. A first connector half 1 is mounted via a cut-out 2 of a first printed board 3 which forms the rear panel of a plug-in rack for the insertion, holding and electrical contacting of printed boards which is not shown in greater detail here. The other, second connector half 4 is arranged in the edge region of a second printed board 5. This second printed board is designed for insertion in the rack, wherein the two connector halves are then plugged into each other.

The first connector half comprises a carrier body 6 which is fixed to the first printed board 3 in front of the cut-out 2 by means of pins 7. A plug-in part 8 is plugged into the carrier body from the back of the printed board. The plug-in part has two oblong spring arms 9 moulded on in one piece and extending in the direction of insertion. The front end of the spring arms is provided with chamfers and latching shoulders, the mode of operation of which is explained in greater detail below.

The front end is formed approximately in a T-shape, wherein the rear shoulders 10 are provided as latching shoulders. An upwards-pointing chamfer 11 is moulded-in in the centre of the crossbar of the T and the side parts of the T formed in this way are provided with downwards-pointing chamfers 12 at the front.

The carrier body 6 has an acceptance cavity 13, matched to the plug-in part 8, into which the plug-in part is plugged. On insertion, the spring arms 9 are initially pressed inwards and their front end finally springs into a rectangular opening 14 in the upper and/or lower wall 15 of the carrier body. The rectangular shoulders 10 on the spring arm, which act as stops and arrive behind the inner wall of the opening 14 acting as stop shoulder 16, prevent the plug-in part from being able to be pulled out of the carrier body.

On the side opposite this latching shoulder, the opening 14 is provided with an upwards-pointing chamfer 17 which becomes operative when the connector is separated. A forwards-extending groove 40 in which the nose 35 of the latching arm of the holding part of the second connector half slides is also moulded-in on the inside of the wall 15. Two optical waveguides 19 provided with plug-in ends 18 are arranged in the plug-in part, wherein the optical front face of the plug-in ends points towards the plug-in side 20 of the first connector half. Only one, or more than one plug-in ends and/or optical waveguides can, however, also optionally be provided. The plug-in ends are held in the plug-in part in a longitudinally displaceable manner and are pressed forwards towards the plug-in side against an internal stop by the force of a spring 21.

The second connector half 4 comprises a holding part 22 which is fixed to the second printed board 5 by means of pins 23. Optical waveguides 25 provided with plug-in ends 24 are also arranged in this holding part, wherein the optical front face of the plug-in ends terminates in a tubular opening 26.

It should be pointed out at this stage that the opening 26 is dimensioned in such a way that the plug-in end 18 of the first connector half 1 can be inserted therein in an accurately guided manner when the two connector halves are assembled.

The plug-in end of the optical waveguide is held in the holding part in a longitudinally displaceable manner, wherein a spring 27 always presses it into a forward position. The holding part also has an upper and a lower latching arm 28 which is flat, moulded on in one piece and projects in the direction of insertion and is shown on an enlarged scale in FIG. 5. At their front ends the latching arms are provided with a recess 29 which is open towards the front, wherein this opening 30 is narrower towards the front side than the width of the recess per se, so that projections 31 are formed.

Towards the front side these projections are chamfered, so that chamfers 32 are formed here. The rear surfaces of the projections which point into the recess 29 run at right angles to the upper side of the latching arm and form stops 33. On the opposite side of the recess 29 a nose 35 projecting into the recess is formed on the latching arm and is chamfered downwards so that a chamfer 36 is present here. Slits 34 are moulded-in on both sides of the nose. The width of the slits is dimensioned in such a way that the strip-shaped projections 41 on the underside of the chamfer 17 can find place therein.

In FIGS. 1 and 2 the connector is shown with two spring arms and latching arms cooperating correspondingly therewith in each case. Optionally, however, provision can also be made for the connector to be provided with only one spring arm and one latching arm.

The basic principle of the connector comprises the fact that the plug-in part 8 is initially latched with the carrier body 6 of the first connector half 1 and that when the connector halves 1, 4 are assembled, this latching is released and the plug-in part 8 is latched with the second connector half 4. The plug-in part 8 is then displaceable in the carrier body 6 and is now only guided by it. When the connector halves are separated, a latching of the plug-in part 8 with the carrier body 6 of the connector half 1 is initially brought about again and then the latching between the connector half 4 and the plug-in part 8 is released.

The process of assembling the connector halves 1, 2 and their locking and the cooperation of the various stops and chamfers will be explained below with the aid of FIGS. 3-1 to 3-6 in conjunction with FIGS. 5 to 9.

On the basis that the plug-in part 8 is inserted into the carrier body 6 fixed to the first printed board 3 and is latched in the opening 14 of the carrier body via the spring arm 9 with its shoulders 10, the plug-in end 18 of the optical waveguide is axially aligned.

When the printed board 5 is plugged into the rack, the latching arm 28 of the second connector half 4 mounted on the printed board is inserted into the first connector half 1, wherein an optimal guiding and alignment of the holding part takes place via the latching arms sliding in lateral slits of the carrier body. On insertion, the chamfer 32 at the front end of the latching arm first presses against the chamfer 12 of the spring arm (FIG. 3-1) and as insertion continues, the spring arm is moved upwards, and into the opening 14 in the carrier body in fact, wherein the opening is, of course, correspondingly dimensioned (FIG. 3-2). The latching shoulders 16 on the carrier body and 10 on the plug-in part which are engaged with each other prevent the plug-in part from being pushed out of the carrier body.

As insertion continues further, the front end of the spring arm arrives in the region of the recess 29/opening 30 in the latching arm and when the stop 33 is above the edge of the shoulder 10 the spring arm springs back into its horizontal position. The front end of the spring arm is then in the recess 29 (FIG. 3—3).

Figures 3, 4:
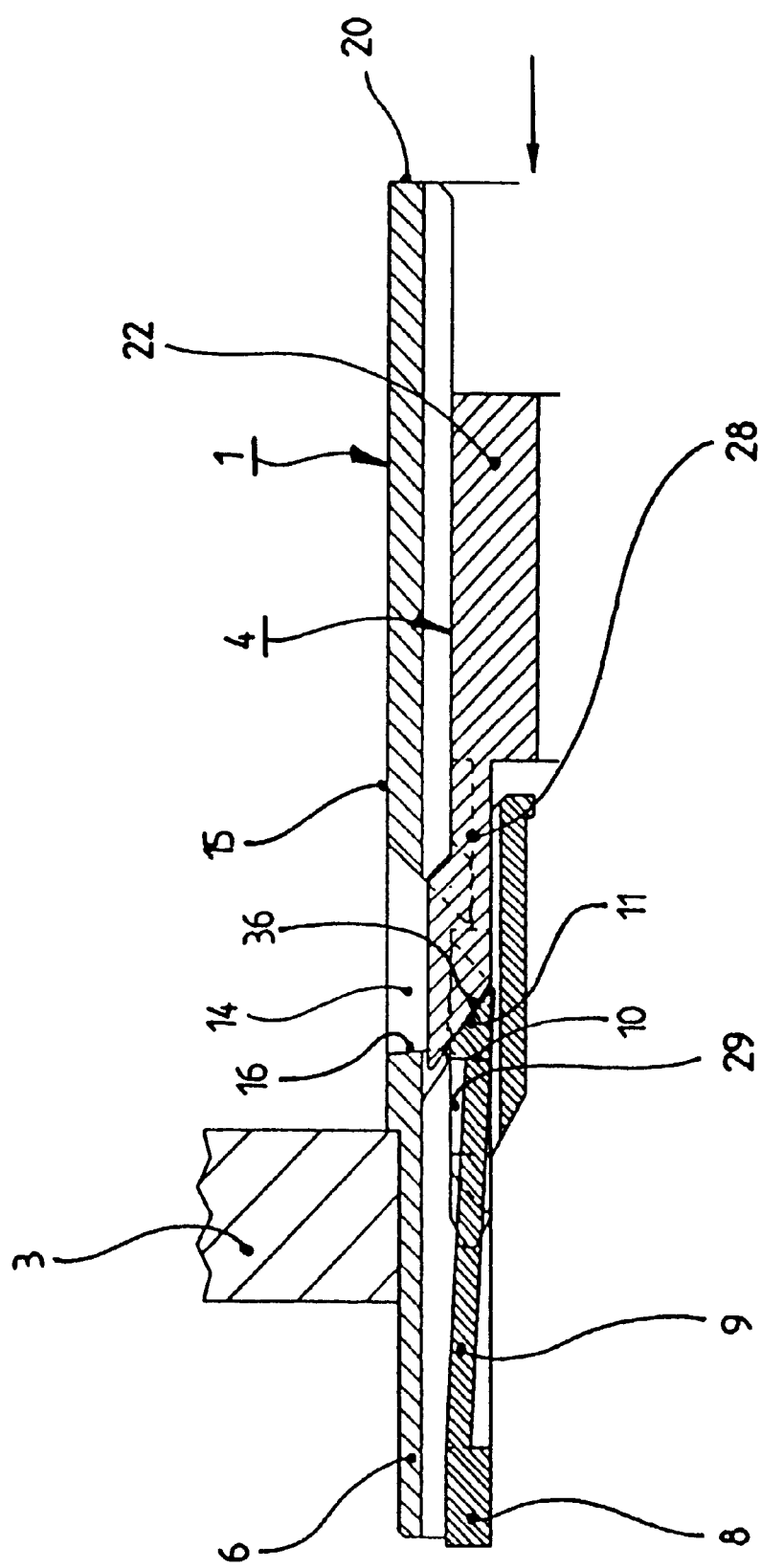

As insertion continues still further, the chamfer 36 in the recess 29 arrives at the chamfer 11 of the spring arm, which chamfer slides along it, and wherein the spring arm 9 is pressed downwards until the latching of the shoulders 10 and 16 is released (FIG. 3-4). Overall the nose 35 is higher than the remaining upper side of the latching arm so that the start of the chamfer 36 is above is the upper side of the latching arm. This means that if the spring arm has not optionally returned to the horizontal position after a separation process has been carried out because of internal frictional forces, the nose 35 with its chamfer 36 still arrives against the chamfer 11. The pre-loaded spring 21 in the plug-in part presses it back until the shoulder 10 on the spring arm rests on the stop 33 of the latching arm. In this case the spring force is so great that the front end of the plug-in end 18 of the optical waveguide of the plug-in part of the first connector half 1, which was pushed into the tubular opening 26 of the holding part 22 of the second connector half 4 during insertion, is pressed against the plug-in end 24 of the other optical waveguide with sufficient force to ensure a faultless optical signal transmission.

Figures 3, 4, 5:
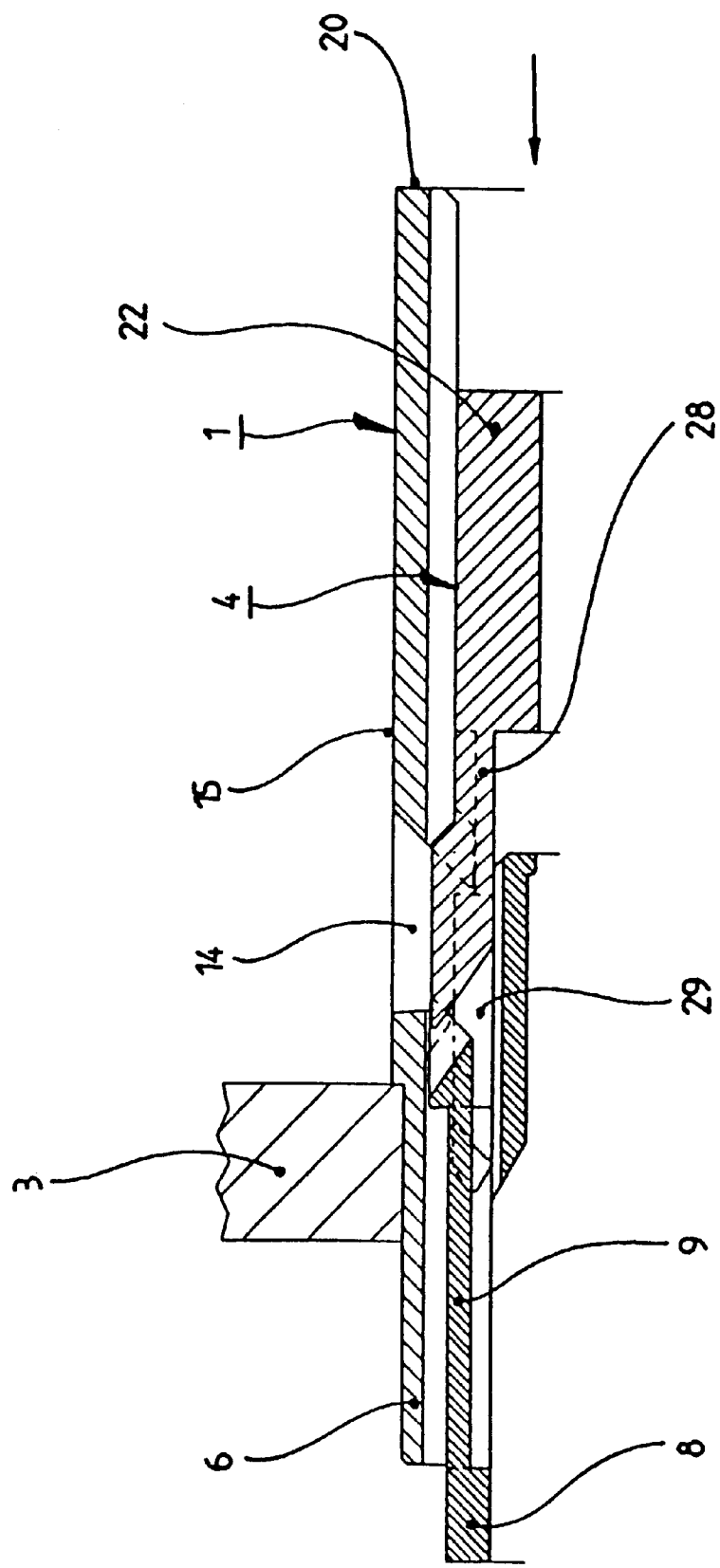
Figures 3, 4, 5, 6:
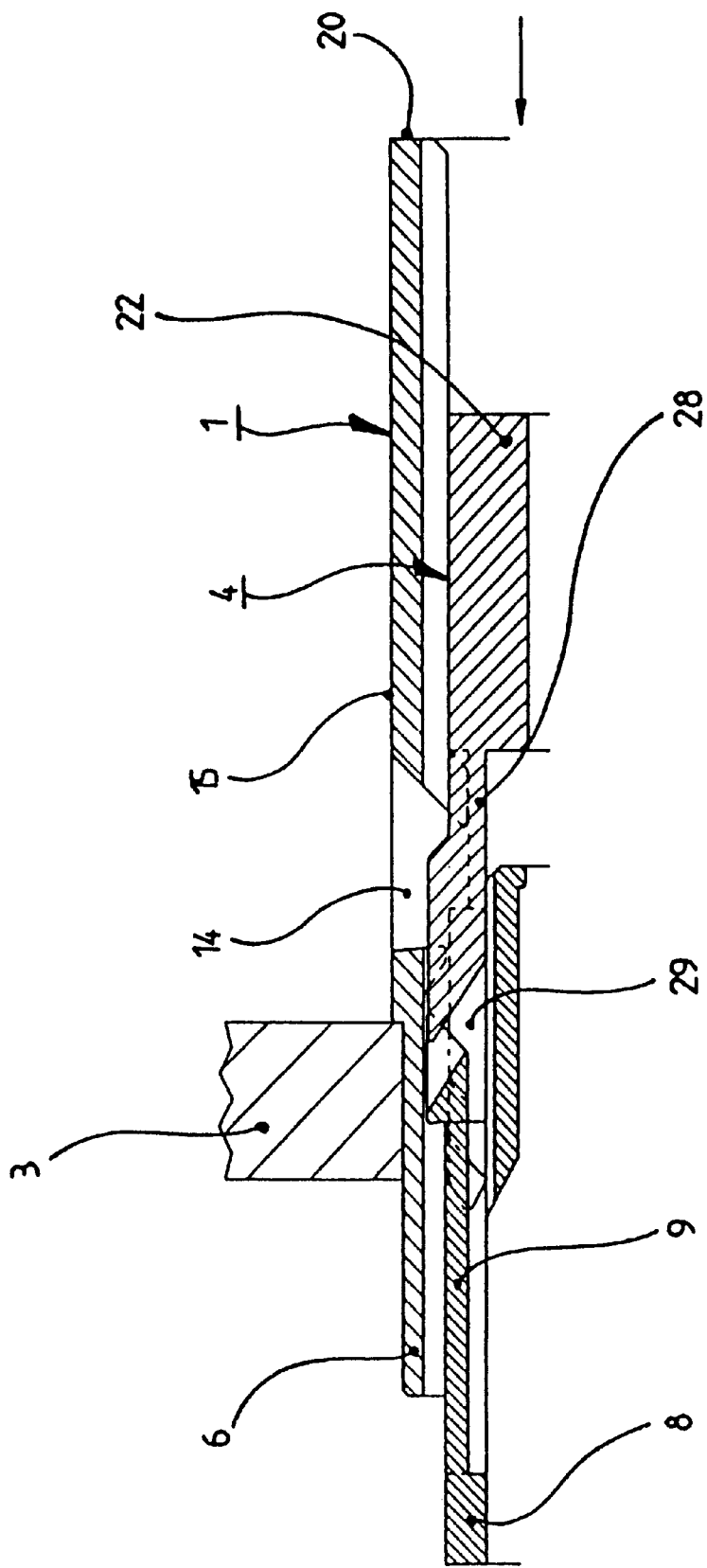
Figures 1, 4:
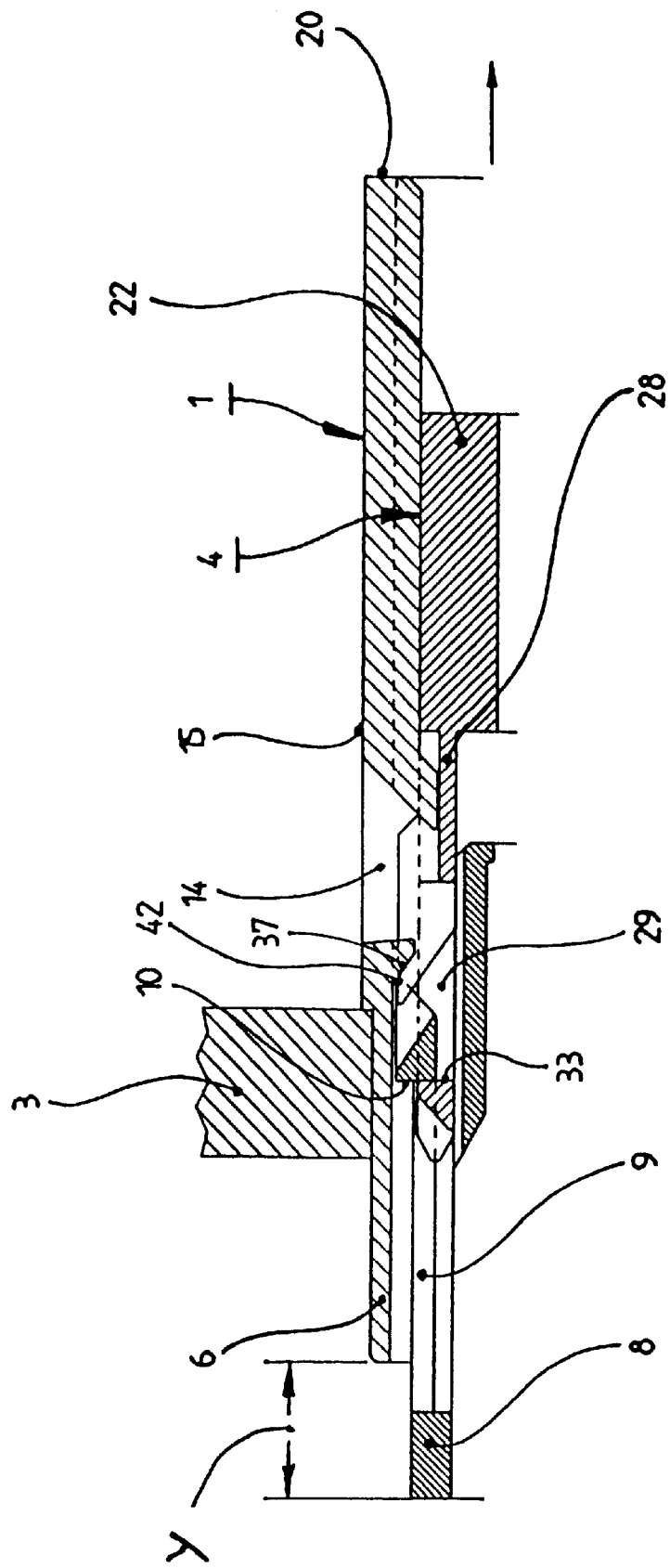
Figures 2, 4:
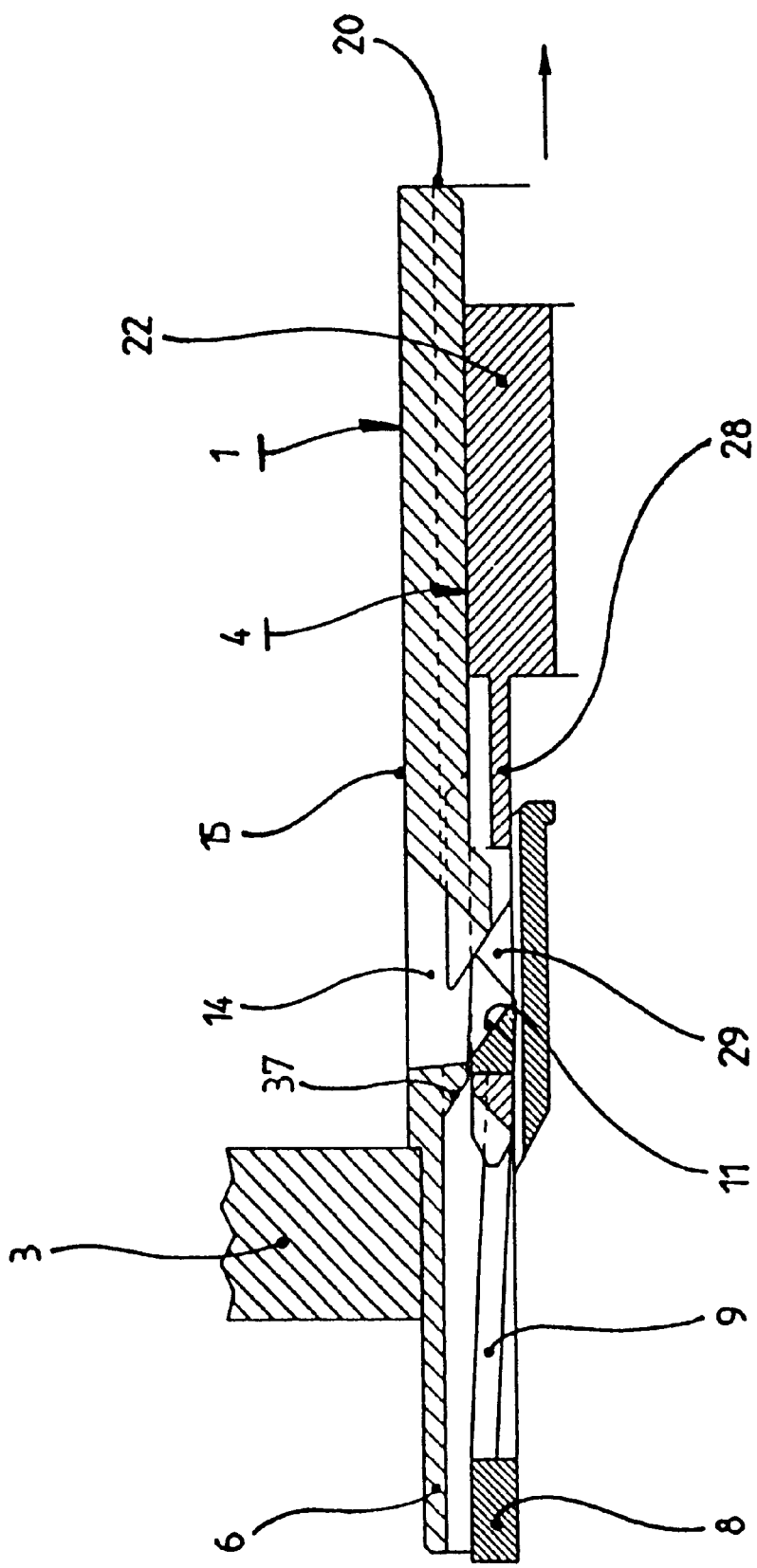
Figures 3, 4:
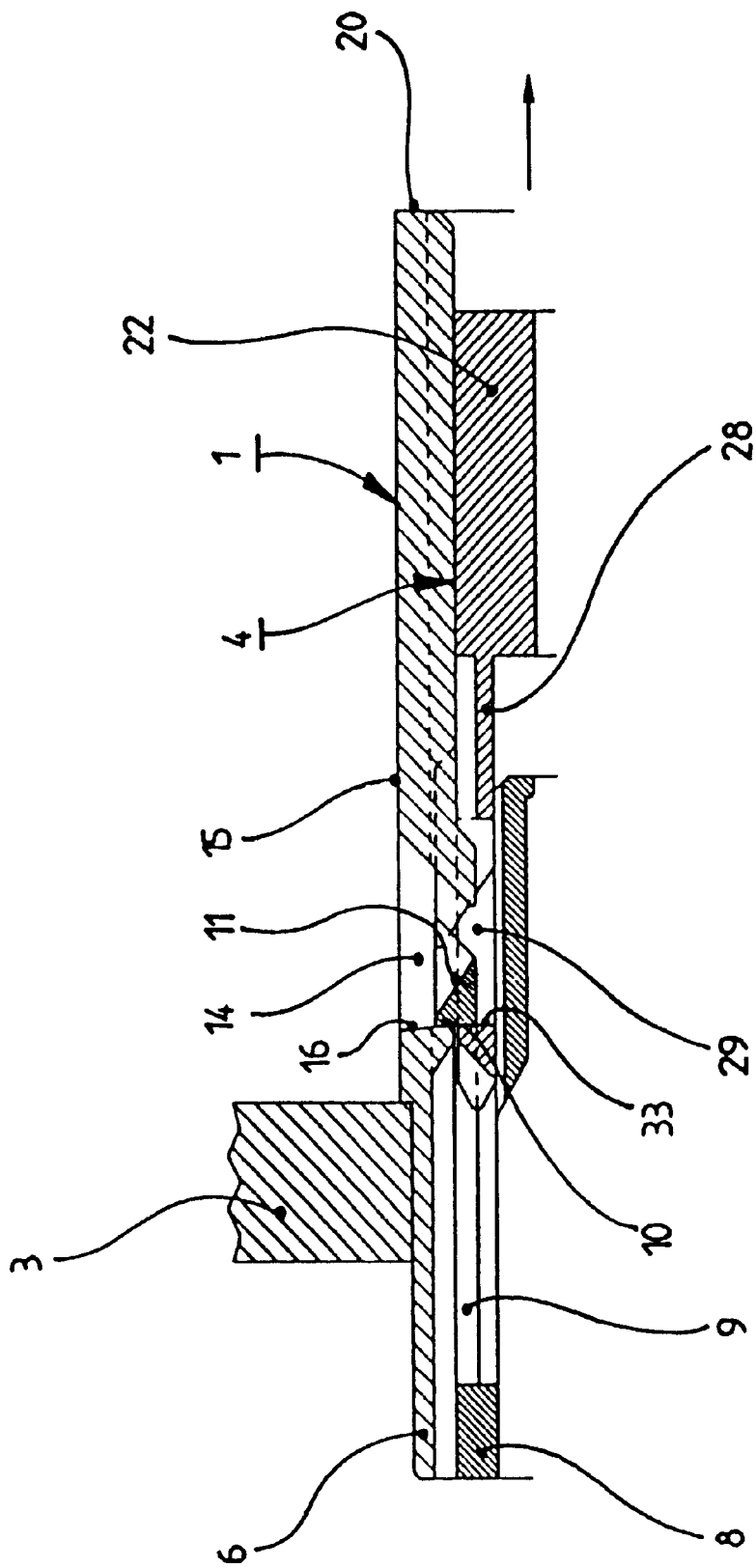
Figure 4:
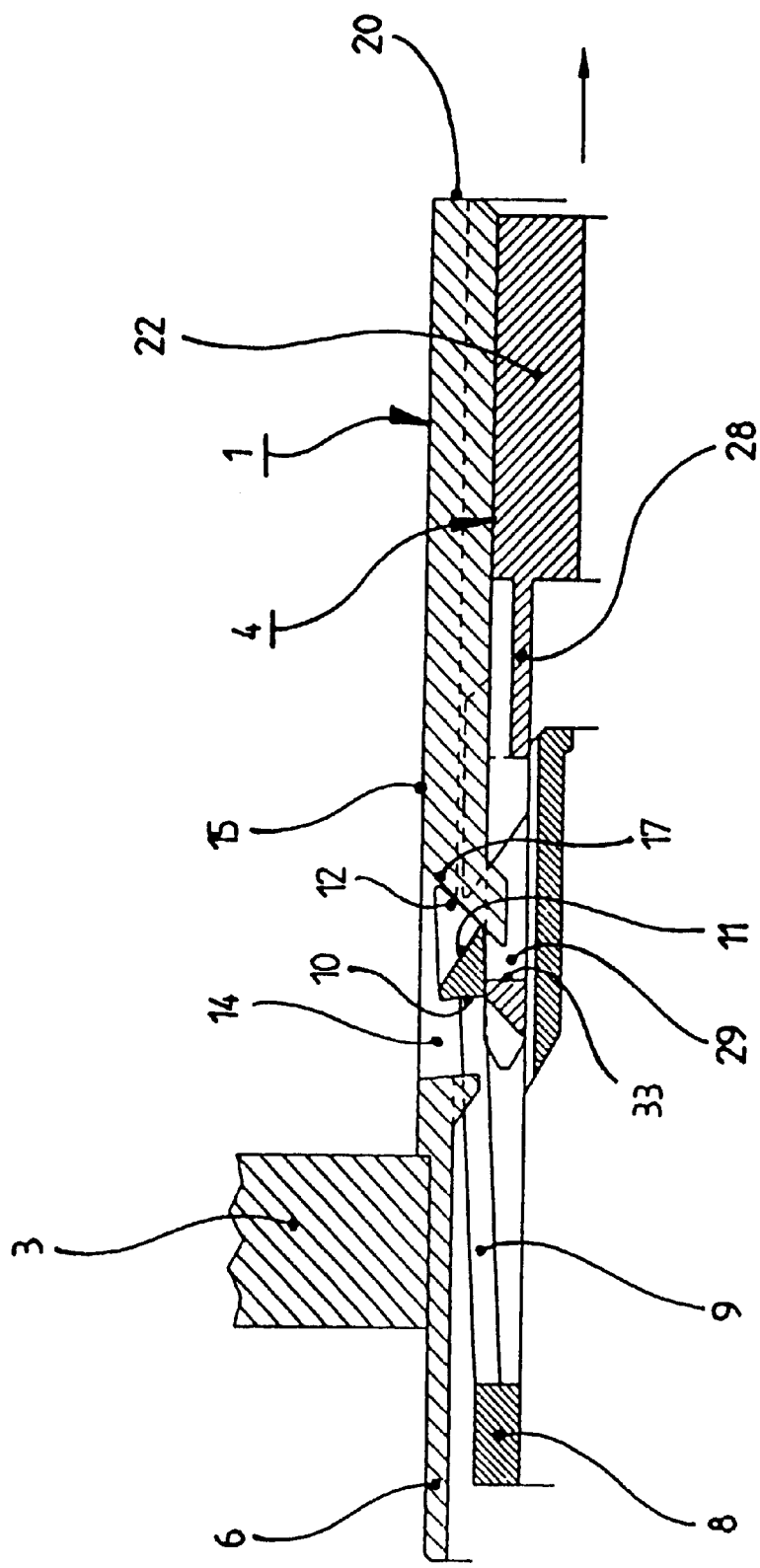
Figures 4, 5:
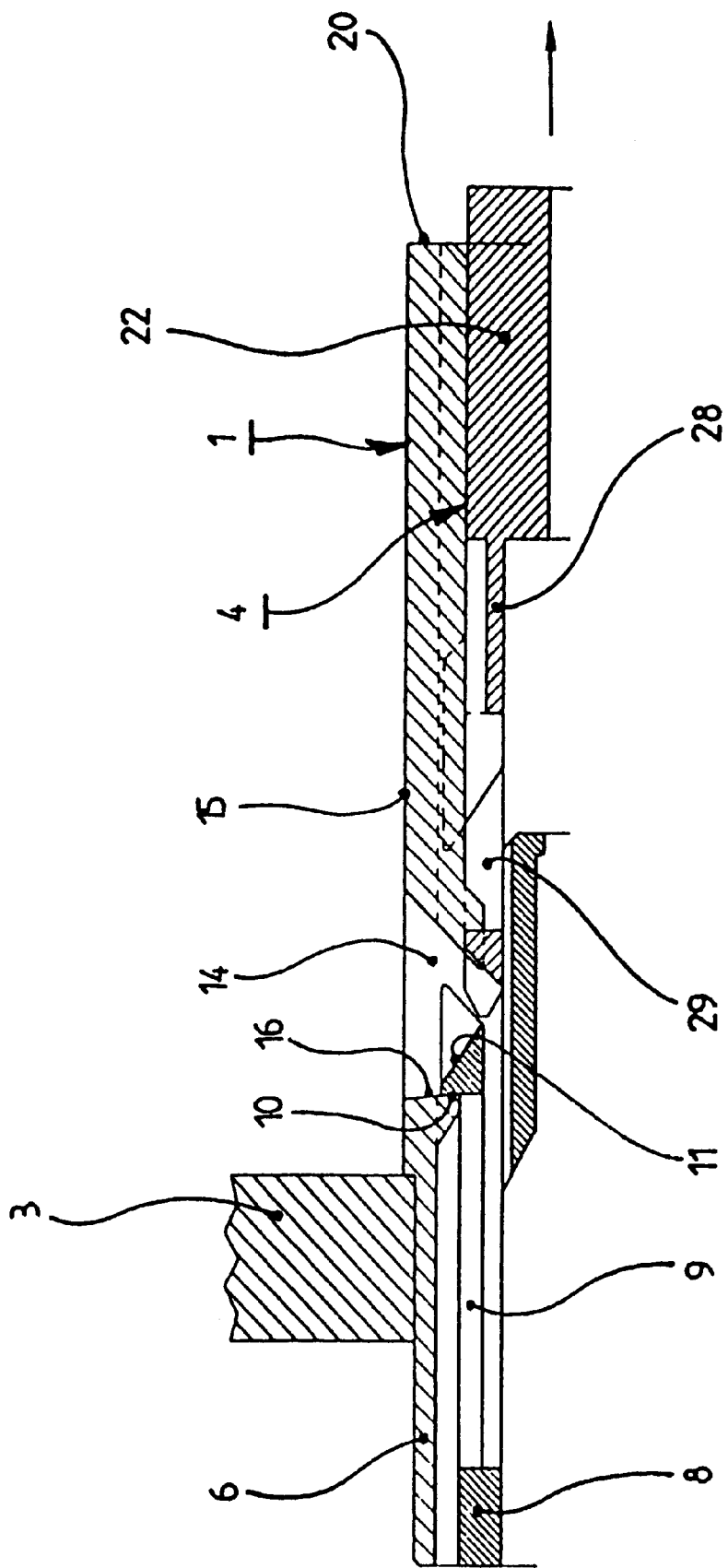
Figure 5:
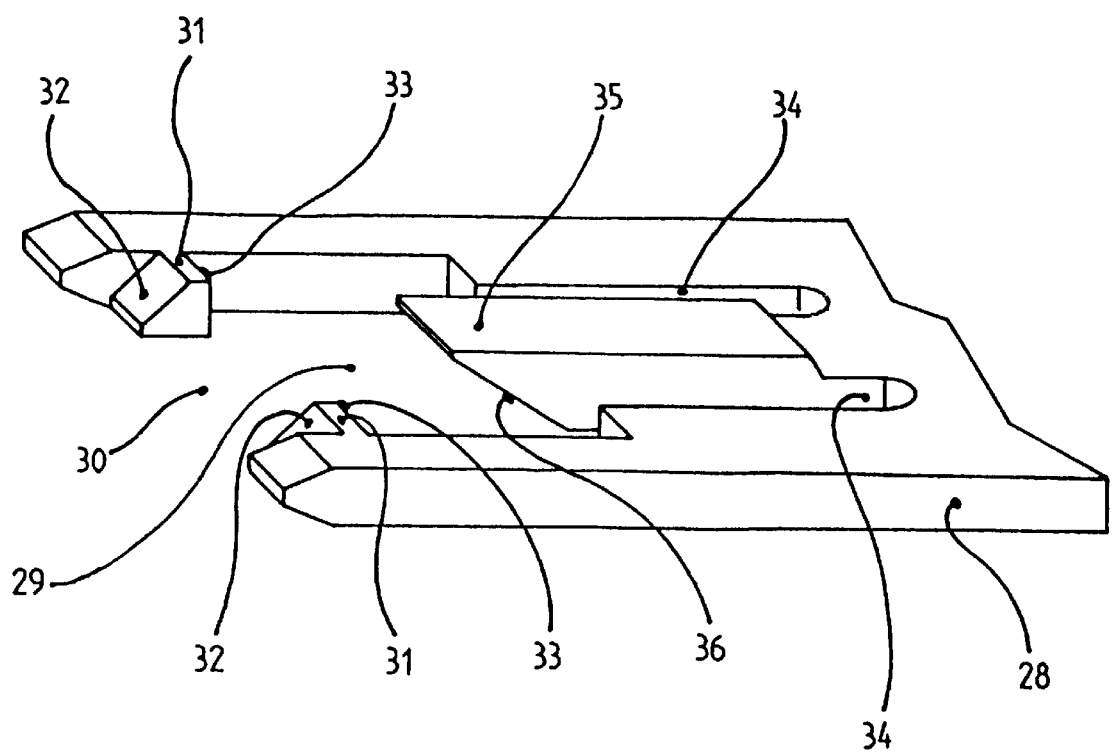
Figures 1, 6:
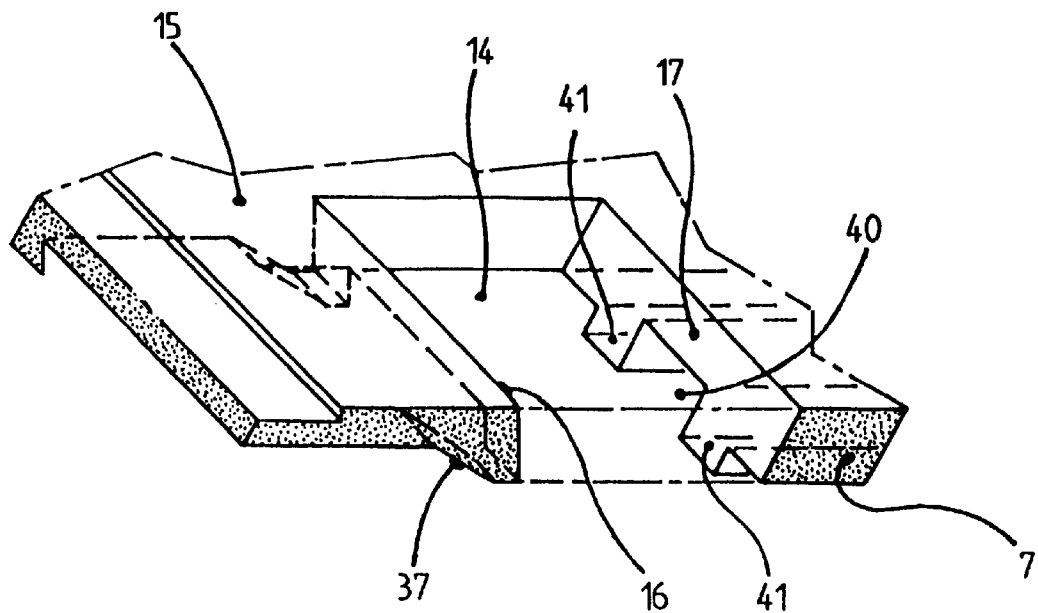
Figures 2, 6:
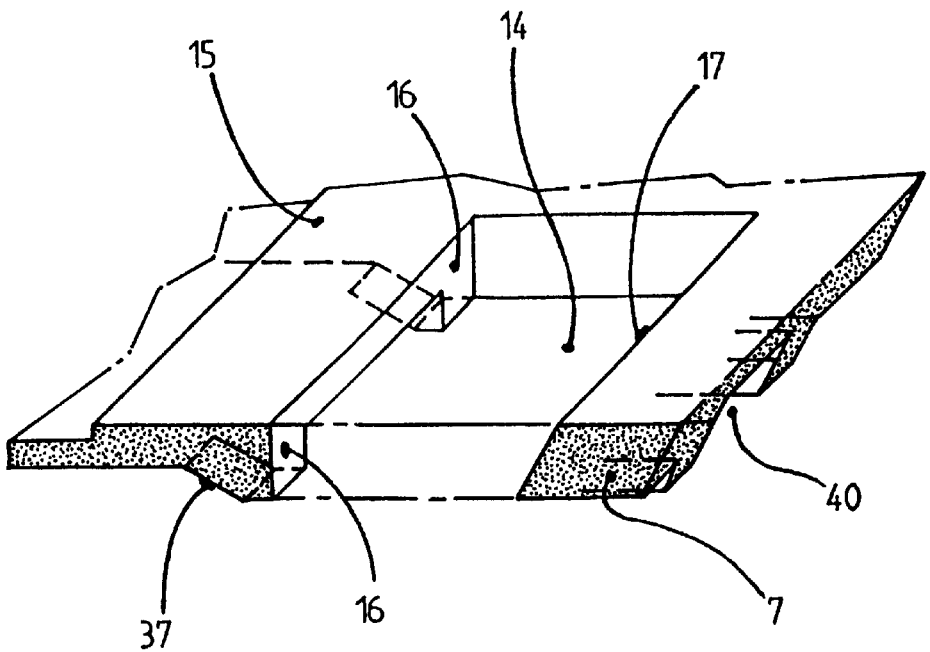
Figures 2, 7:
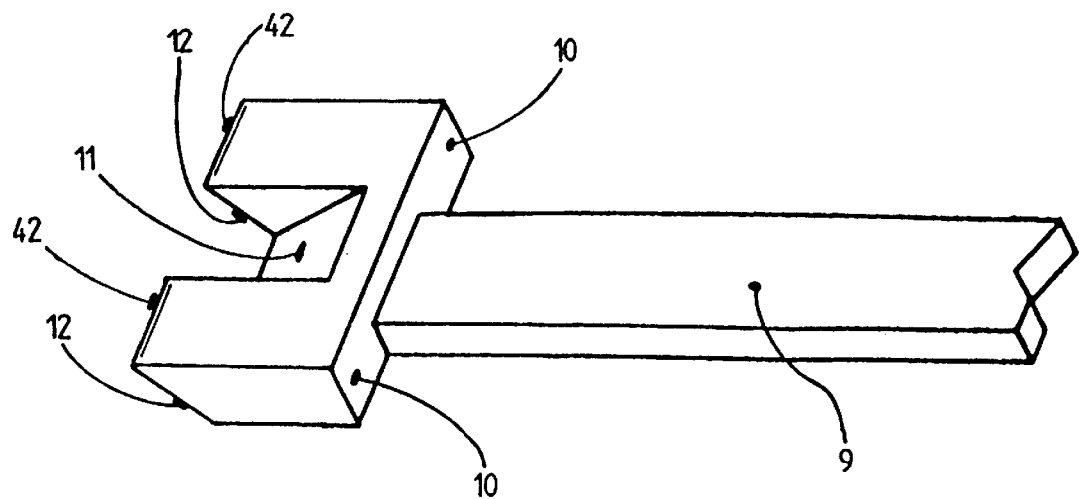
Figures 1, 7:
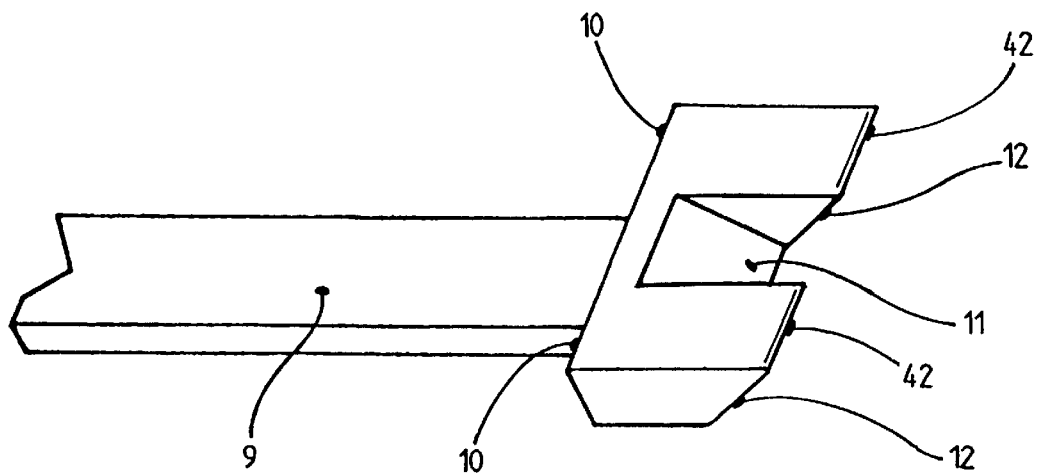
Figures 2, 10:
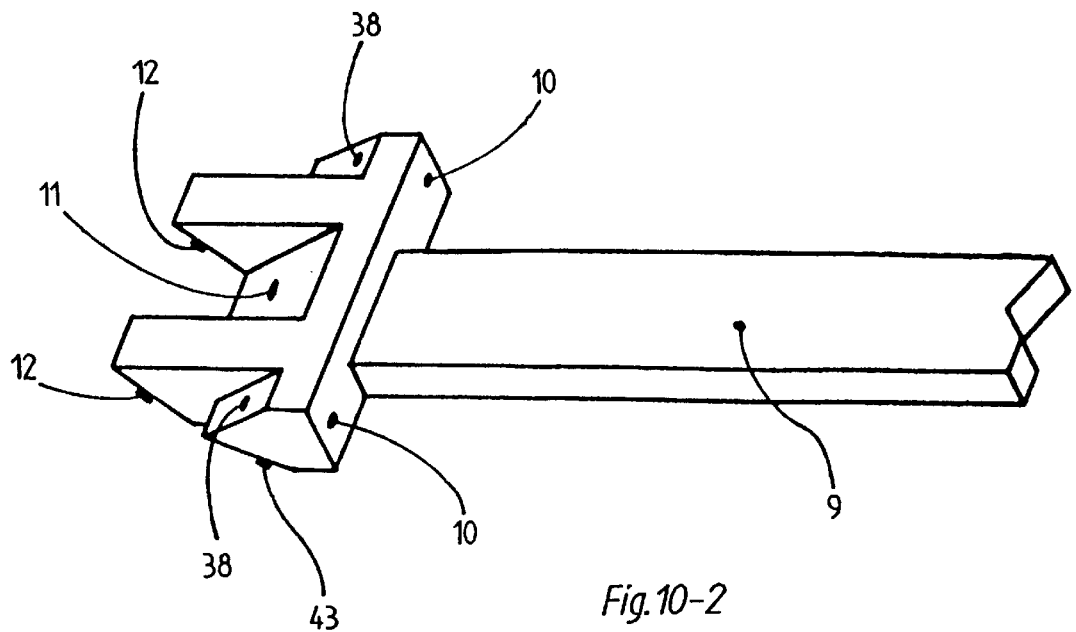
Figures 1, 10:
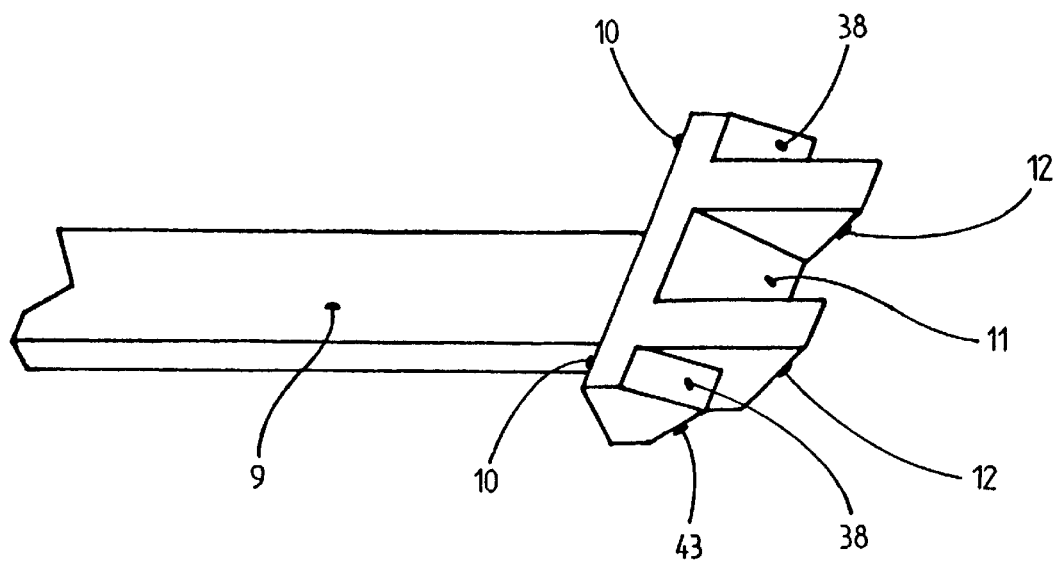

The spring arm 9 then moves upwards again until it reaches its horizontal position. The spring arm is then in its "0" position, i.e. it is not deflected (FIG. 3-5).

In the insertion process the latching between the plug-in part and the carrier body was released, and with the connector fully inserted the plug-in part is connected/latched to the holding part 22 by means of its latching arm 28. Because of the released latching the plug-in part is thus no longer connected to the carrier body but only guided in it, and no insertion forces are transmitted to the first printed board 3. In this position the spring arm 9 is trapped between the upper wall 15 of the carrier body and the body of the plug-in part 8 so that an unlocking of stop 33 and stop 10 is not possible. This is why the locking is extremely reliable overall (FIG. 3-6).

The process of separating the connector will be explained below with the aid of FIGS. 4-1 to 4-5 in conjunction with FIGS. 5 to 9:

When the printed board 5 is pulled out of the rack the latching arm 28 of the holding part 22 is moved to the right, wherein the stop 33 on the latching arm presses against the shoulder 10 of the spring arm on the plug-in part (FIG. 4-1) until finally the front, upper edge 42 of the chamfer 12 of the spring arm runs agains the chamfer 37 and the spring arm is pressed downwards, through the cut-out recess 29 in the latching arm (FIG. 4-2).

The shoulder 10 of the spring arm then arrives against the shoulder 16 of the carrier body again whereas the stop 33 of the latching arm is still aligned against the stop 10 of the spring arm. The spring arm can return to its horizontal position (FIG. 4-3). If the ((....)) caused by frictional forces between the shoulders 10 and 16 does not take place, the lower ends of the chamfer 17, which are located under the upper side of the projection 31 of the latching arm, act against the upper end of the chamfer 12 of the spring arm and press it into the horizontal position.

Finally, the chamfer 12 of the spring arm arrives against the chamfer 17 of the carrier body, and the spring arm is pressed upwards again (FIG. 4—4) and the latching of the stops 10 and 33 is released. The pre-loaded spring 21 now acts and presses the plug-in part back until it is stopped at the shoulder 16 by the stop of the shoulder 10 (FIG. 4-5). The connection between the two connector halves and/or between the plug-in part and the holding part is released and the printed board 5 can be pulled out of the rack.

In the course of both positions, connector latched or not latched, the spring arm of the carrier body is always in its un-deflected position, i.e. it is unloaded.

A modification of the latching system will be explained below with the aid of FIGS. 10-1, 10-2, 11 and 12. In this case an upwards-pointing, short chamfer 38 and a downwards-pointing chamfer 43 is formed on each side of the front end of the spring arm 9. The chamfers 38, 43 run towards each other and end in a point which lies behind the chamfer 12 in spatial terms. In the insertion process the two chamfers 43 act against the chamfers 32 of the latching arm 28 of the holding part 22.

Figure 11:
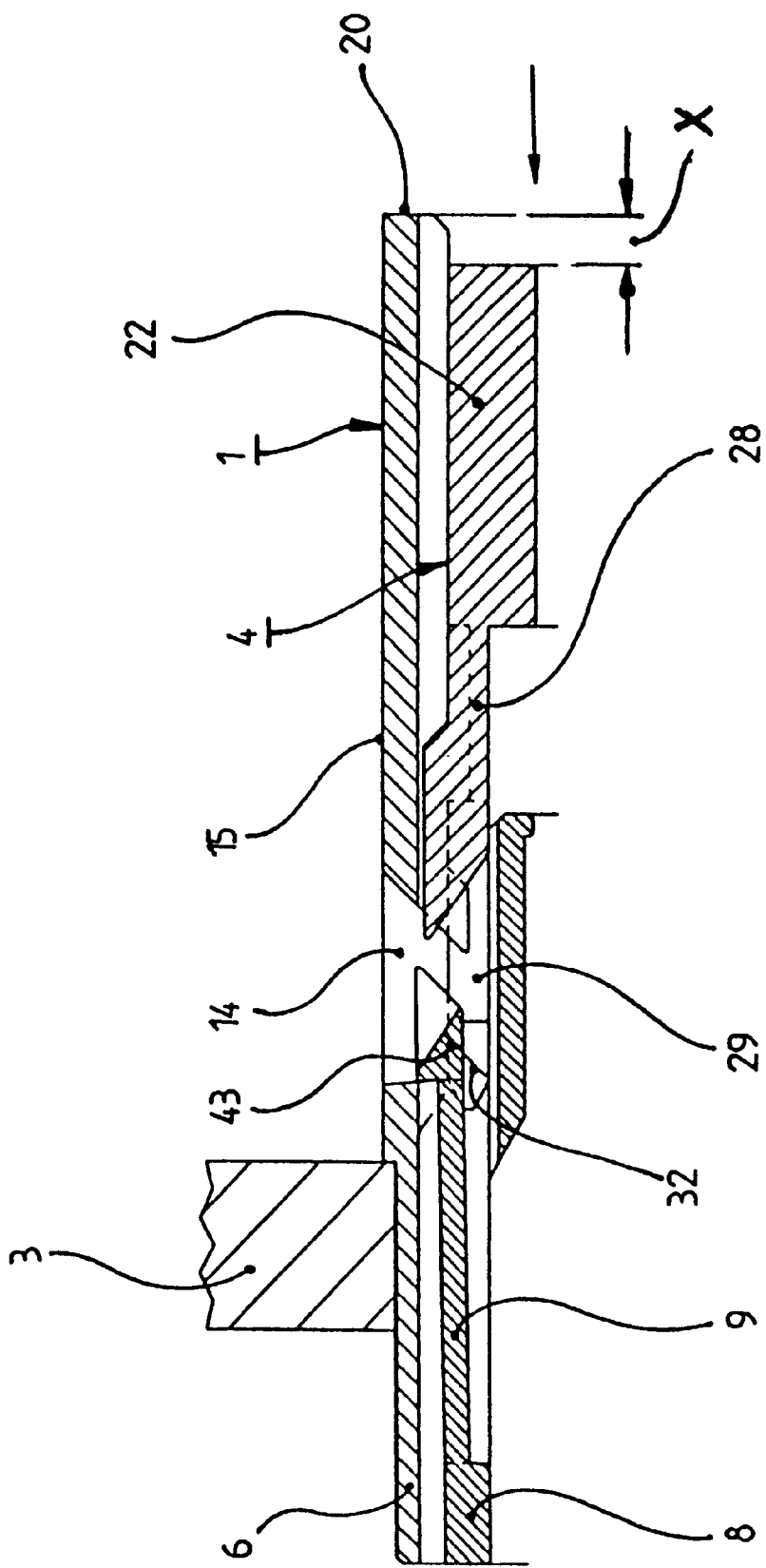

The advantages of this modified embodiment will emerge from a comparison of FIGS. 3-1 and 11 which show the relative positions of the holding part 22 and the plug-in part 8 when the connector is assembled in the same insertion sequence. The holding part 22, i.e. its latching arm 28, is pushed deeper into the carrier body 6 and the embodiment according to FIG. 11 has a latching and locking mechanism that is shorter overall than FIG. 3-1, as can be seen from the different distances X.

The two chamfers 38 work against the chamfers 37 of the upper wall of the carrier body when the connector is separated and their mode of action is explained below:

When the printed board 5 is pulled towards the front of the rack the stops 33 in the recess of the latching arm are moved against the shoulders 10 on the spring arm until the chamfers 38 of the spring arm are pressed against the chamfers 37 on the carrier body. As pulling continues, the spring arm is pressed downwards by these chamfers. Because of these chamfers and their geometrical arrangement, the plug-in tolerance in the direction of insertion can be increased without needing to increase the overall length of the carrier body.

Figure 12:
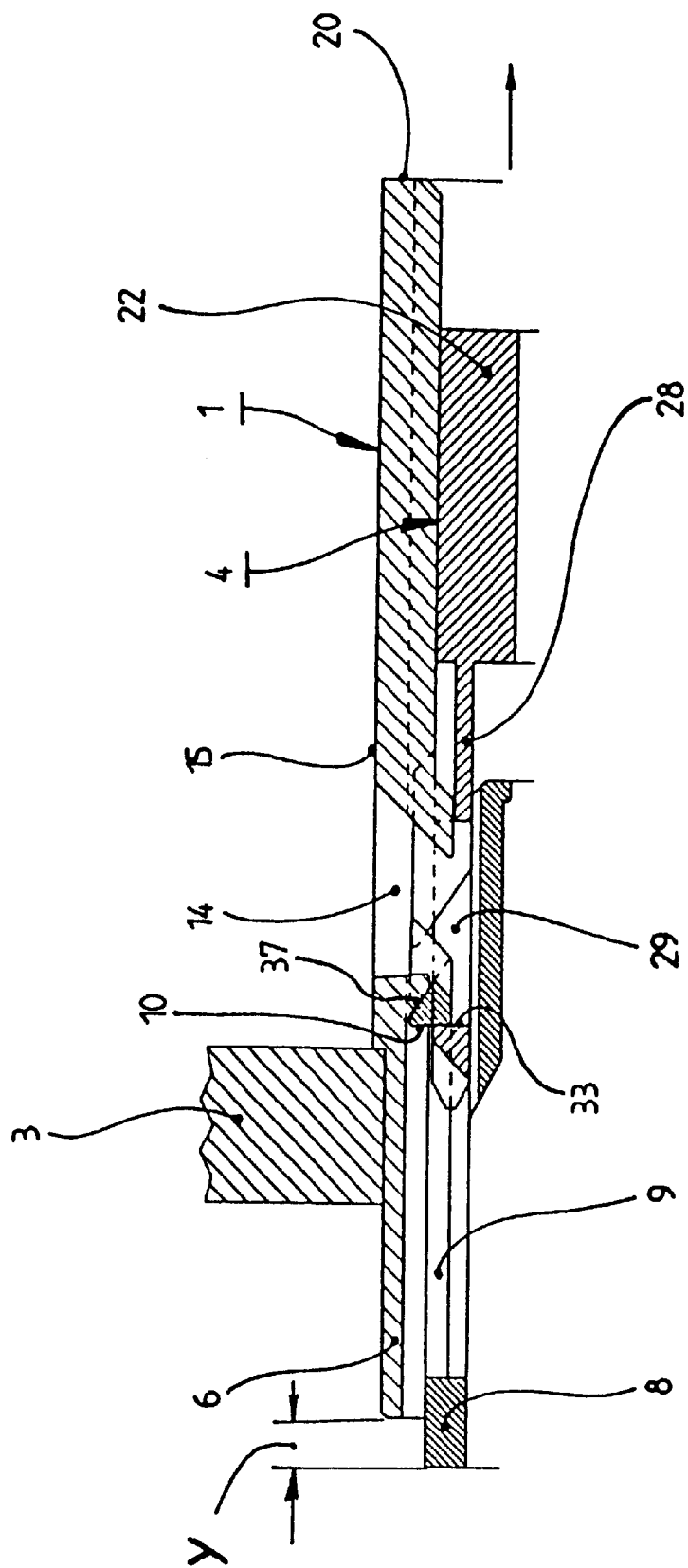

The advantages of this modified embodiment will emerge from a comparison of FIGS. 4-1 and 12, which show the relative positions of the plug-in part 8 and the carrier body 6 in the course of the separation of the connector. The holding part 22, i.e. its latching arm 28, acts on the spring arm 9 with the plug-in part 8 inserted more deeply into the carrier body 6, so that the embodiment according to FIG. 12 has a greater plug-in tolerance than FIG. 4-1, as can be seen from the different distances Y.

With this movement of the spring arm, a friction arises between the shoulders 10 lying against each other and the stop 33 until the spring arm is deflected.

The shoulders 10 of the spring arm then latch against the shoulders 16 of the carrier body whilst the stops 33 still press on the shoulders 10 of the spring arm. The spring arm returns to its horizontal 0-load position whereas frictional forces still arise between the shoulders 10 of the spring arm and the stop 33.

The chamfers 12 of the spring arm then press on the chamfers 17 on the carrier body and the spring arm is pressed upwards again and the latching between the shoulders 10 and the stop 33 on the latching arm is removed.

The chamfers 17 of the carrier body and the chamfers 12 of the spring arm are always operative, i.e. work against each other, when the spring arm has not fully returned to its original horizontal position (its 0-load position), just as the chamfer 36 of the latching arm only acts against the chamfer 11 on the spring arm when the spring arm has remained in a raised position after the chamfers 32 of the latching arm have pressed the spring arm upwards in the insertion process. Occurrences of this kind can optionally arise by plastic deformation of the spring arm as a result of ageing, frictional forces, contamination or burrs on the operative parts of the locking system.

A substantial advantage of the additional chamfers 38 and 43 on the spring arm further lies in the fact that the movement clearance of the spring arm in the separation and/or insertion direction can be reduced, compared with the first embodiment, in which the chamfers 12 only act against the chamfers 17 on the carrier body. By means of the additional chamfers, for example, the required length of the connection system on the back of the rear panel printed board is reduced by approximately 3 mm. The risk of the locking jamming is also reduced and the spring arm returns to its 0-load position more easily.

The above description explains the connector according to the invention when used as an optical waveguide connector. Using the same principle, provision can, however, also be made for the plug-in parts of the connector to be designed as so-called end pressure contacts, wherein the faces of the contact parts are then pressed against each other when the connector is assembled.

We claim:

1. Connector, preferably connector for optical waveguides, comprising two connector halves which latch together when assembled and in which at least one plug-in and/or contact part is held in each case, and wherein the faces of the plug-in and/or contact parts are pressed against each other in a resilient manner when the connector halves are assembled, wherein the first connector half (1) has a carrier body (6) in which a plug-in part (8) is inserted and initially latched, wherein the plug-in end (18) of an optical waveguide (19) and/or of an end pressure contact is held in the plug-in part (8) against the force of a spring (21) in a longitudinally movable manner, that the second connector (4) half contains the plug-in end (24) of an optical waveguide (25) and/or of an end pressure contact, that latching means for latching with the plug-in part (8) of the first connector half (1) are provided on the second connector half (4), that the latching between the plug-in part (8) and the carrier body (6) is released when the connector halves (1, 4) are assembled, that a latching of the plug-in part (8) with the second connector half (4) takes place before the release of this latching, wherein the plug-in part is then held in the carrier body in a longitudinally displaceable manner, and that when the connector halves (1, 4) are separated, a latching of the plug-in part (8) with the carrier body (6) initially takes place again and then the latching between the plug-in part (8) and the second connector half (4) is released, and wherein the carrier body (6) has a rectangular opening (14), that the plug-in part (8) has at least one spring arm (9), whose end is formed in a T-shape and is provided with stops (10) and chamfers (11, 12), that the plug-in part (8) is inserted into the carrier body (6) in such a way that the end of the spring arm engages in the opening (14), wherein the plug-in part is held behind the stop (16) formed by the opening by latching of the stop (10), that the second connector half (4) has a holding part (22) in which the plug-in end (24) of an optical waveguide (25) and/or of an end pressure contact is provided, wherein this is held in a longitudinally movable manner optionally against the force of a spring (27), that at least one latching arm (28) extending in the direction of insertion is formed on the holding part (22), that at its front end the latching arm is provided with a recess (29) having chamfers (32, 35) and stops (33), and that the front end of the latching arm (28) and its recess (29) is formed and arranged in such a way that when the connector halves (1, 4) are assembled, the front end of the spring arm of the plug-in part (8) is initially bent upwards and removed from the opening (14) in the carrier body (6) and then engages in the recess (29) in the latching arm (28) and is held therein in a latching manner, wherein the plug-in ends (18, 24) of the optical waveguides (19, 25) and/or of the end pressure contacts are pressed together in a resilient manner.

2. Connector according to claim 1, characterized in that the first connector half (1) is provided on a rear panel printed board (3) of a rack for receiving printed boards (5).

3. Connector according to claim 1, characterized in that the holding part (22) of the second connector half (4) is provided on a printed board (5) which can be plugged into the rack.

4. Connector according to claim 1, characterized in that the front end of the spring arm (9) is provided with two additional chamfers 38 which cooperate with chamfers (37) on the wall (15) of the carrier body (6).

5. Connector according to claim 4, characterized in that an upward-pointing chamfer (38) and a downward-pointing chamfer (43) is formed on each side of the front end of the spring arm (9), which chamfers run toward each other and end in a point which lies behind the chamfer (12) in spatial terms.

* * * * *